Feb. 16, 1965 R. B. RILEY 3,170,108

BROADBAND FREQUENCY DOUBLING

Filed Dec. 5, 1960 2 Sheets-Sheet 1

INVENTOR
RUSSELL B. RILEY

BY J. C. [signature]

ATTORNEY

INVENTOR
RUSSELL B. RILEY
BY J. I. Chojnacki
ATTORNEY

United States Patent Office 3,170,108
Patented Feb. 16, 1965

3,170,108

BROADBAND FREQUENCY DOUBLING

Russell B. Riley, Palo Alto, Calif., assignor to Hewlett-Packard Company, Palo Alto, Calif., a corporation of California Filed Dec. 5, 1960, Ser. No. 73,614
15 Claims. (Cl. 321—69)

This invention relates to microwave apparatus and more particularly to a microwave harmonic generator which produces the second harmonic of an applied signal frequency with high conversion efficiency over a broad band of operating frequencies.

Certain types of microwave antennas operate either in the K band or in the R band. The K band extends from 18 to 26.5 kilomegacycles. The R band extends from 26.5 to 40 kilomegacycles. It is essential in some applications to know the manner in which these antennas radiate electrical energy at various frequencies. The particular radiation characteristics of an antenna can be readily understood from an examination of the radiation patterns obtained for the antenna. A radiation pattern can be obtained in a test procedure by applying power to the antenna at various frequencies within the operating band and by recording the field strength at coordinate points about the antenna. A klystron oscillator and associated equipment may be used to supply signal power to the antenna at frequencies that are within a small portion of the desired microwave band. Klystron oscillators are commonly known to those skilled in the art as substantially constant frequency devices which produce frequencies that can be varied a few percent about the design center frequency. Thus the entire microwave band of frequencies can be provided for the test procedure by using several such klystron oscillators, each operating over only a portion of the desired band.

A less complex and less expensive method of providing signal power at frequencies within the K band or R band is to use a signal generator operating over a lower portion of the microwave spectrum and a frequency doubling device. Signal generators which produce frequencies that extend from 13.25 to 20 kilomegacycles are readily available and are thus well suited for use with a frequency doubling device. The output power produced by this method, however, is usually 5 to 15 percent of the power that is produced by a klystron oscillator, and may typically be of the order of 1 milliwatt. This amount of output power is adequate for many testing applications. In addition, the relative simplicity of this method makes is particularly well suited for evaluating the radiation patterns of antennas under conditions that do not require a great deal of electrical power.

Frequency doubling devices of the narrow band type are discussed in the literature. (See Johnson, Slayer and King, "Millimeter Waves From Harmonic Generators," Review of Scientific Instruments, vol. 25, March 1954, pp. 213–217.) One disadvantage encountered in using frequency doublers of this type is that they require retuning each time the applied signal frequency is varied. It is highly desirable in broad band applications to provide a frequency doubling device which does not require adjustment or tuning as the applied frequency is varied, and which maintains relatively high frequency conversion efficiency over the entire band of operation.

Accordingly, it is an object of the present invention to provide frequency doubling apparatus which produces the second harmonic of an applied signal frequency with high conversion efficiency over a broad band of microwave frequencies.

It is another object of the present invention to provide frequency doubling apparatus which reduces the magnitude of the second harmonic power that is reflected toward the signal source.

In accordance with the illustrated embodiment of the present invention, a crystal rectifier is positioned within a short section of ridged waveguide in a direction that is transverse to the direction of power propagation through the ridged waveguide section. A first transition section is provided to convert the rectangular waveguide system of the applied signal to the ridged waveguide of the crystal rectifier section. The first section also provides an impedance match between the applied signal transmitting system and the crystal rectifier section. Filtering means are provided in the transmission system of the applied signal frequency to absorb the second harmonic power that is reflected toward the signal source. A second transition section is provided to convert the cross-section of the crystal rectifier section to the standard rectangular area of waveguide apparatus that is used to transmit the second harmonic frequency.

Other and incidental objects of the present invention will be apparent from a reading of this specification and an inspection of the accompanying drawing in which.

Figures 1, 2:
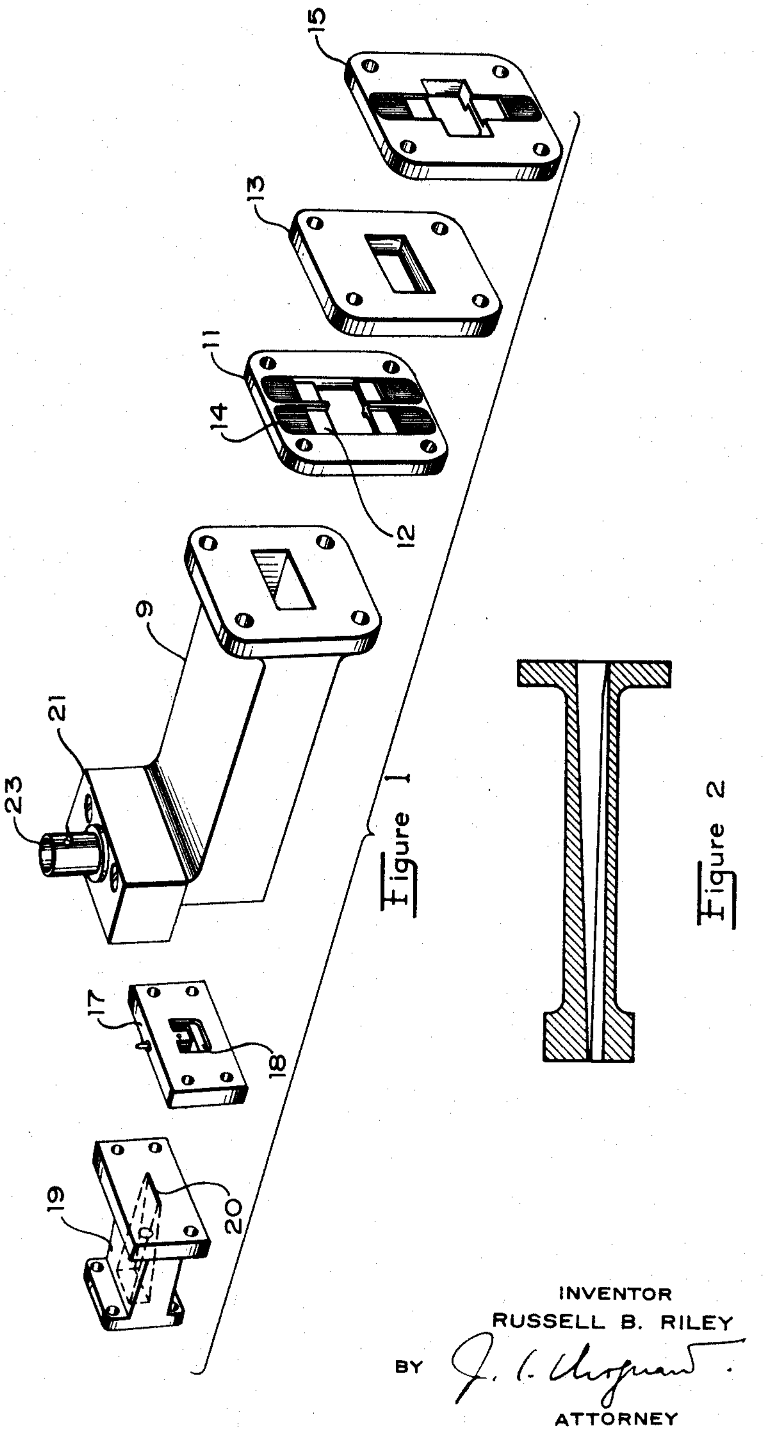
FIGURE 1 is an exploded view showing the several parts of the frequency doubling apparatus of the present invention.
FIGURE 2 is a cross-sectional view of the ridged waveguide transition section.

Referring now to FIGURE 1, there is shown a section 9 which serves as a transition from rectangular to ridged waveguide and to which there is attached filter 11, separator section 13, and filter 15. At the other end of section 9 there is attached a crystal mount and filter 17 and a tapered waveguide section 19. A mount 21 is provided for connector 23 which provides an external connection to the crystal located in the crystal mount and filter 17. In operation, power at the fundamental frequency is applied through filters 15 and 11 to waveguide section 9. The power propagated along the length of waveguide section 9 at the fundamental frequency of operation is applied to the crystal located within the crystal mount and filter 17 which will be described hereinafter. The frequency which is applied to the crystal or diode is distorted as a result of the rectification that is provided by the crystal. The distorted waveform is known, through the use of Fourier analysis, to contain a D.-C. component and various harmonics of the fundamental frequency. The dimensions of waveguide section 19 are chosen to propagate power at harmonics of the applied fundamental frequency and to cut off the fundamental frequency.

As a result of the mismatch between waveguide section 9, crystal mount and filter 17, and the tapered section 19, there results a reflected wave which travels along waveguide section 9 in a direction opposite to the incident wave. The reflected wave contains power at the fundamental frequency and at the second harmonic of the fundamental frequency. The second harmonic power of the reflected wave traveling from the load toward the generator must be adsorbed to prevent the development of undesirable standing waves.

Filters 11 and 15 are provided to absorb power at the second harmonic of the fundamental frequency which is reflected from the crystal rectifier toward the generator. The second harmonic reflected wave propagates through the waveguide sections 9 and 13 primarily in two modes. The first mode of propagation, designated as the $TE_{10}$ mode, is identified by the half-sinewave shape of the distribution of the electric field intensity vectors across the broadest dimension of the waveguide. The second mode of propagation, designated as the $TE_{20}$ mode, is identified by the double half-sinewave shape of the distribution of the electric field intensity vectors across the broadest dimension of the waveguide. Filter section 15 is provided to absorb the power of the reflected wave which propagates in the first ($TE_{10}$) mode and filter section 11 is provided to absorb the power of the reflected wave which propagates in the second ($TE_{20}$) mode.

When in position between waveguide section 9 and separator section 13, filter section 11 comprises a short section of waveguide having four smaller waveguides on each face thereof located along the broad wall of the wave guide, which smaller wave guides are oriented in a direction transverse to the direction of power propagation through the section. Each of the smaller wave guides or side arms 12 has a width that is substantially equal to half the width of the broadest wall of the larger or main wave guide. An absorbing load 14 is placed in each side arm a short distance from its junction with the main waveguide. The dimensions of the side arms are chosen to produce a low frequency guide cutoff that is above the fundamental frequency. The second harmonic and higher frequencies attenuate less rapidly in the side arms than the fundamental frequency because of the properties of the side arm guides beyond cutoff. Thus, more power is coupled into the absorbing loads in the side arms at the high frequencies than at the fundamental frequency. As a result, less of the reflected power propagates through the filter section 11 at the high frequencies than at the fundamental frequency.

The economical construction features of filter section 15 are similar to those of filter section 11, except that only two smaller wave guides or side arms are provided on each face of the filter section. The side arms are located in the center of the broad walls of the main guide, and have construction characteristics that are substantially similar to the side arms previously described in connection with filter section 11. Separator section 13 is provided to prevent interaction between the two filters.

The recessed portion 18 of crystal mount 17 forms a cavity when crystal mount 17 is attached to the end of waveguide section 9. This cavity is a quarter wave length deep at the design center of the second harmonic frequency of the apparatus, and thus serves as a stub or shorted line at high frequencies. The effect of this stub line is to cause the second harmonic power which tends to propagate back through waveguide 9 to be reflected in the direction of waveguide section 19, thereby serving to provide more second harmonic power at the output of section 19.

Referring to FIGURE 2, there is shown a cross-sectional view of the ridged waveguide or transition section 9 of FIGURE 1.

Figure 3:
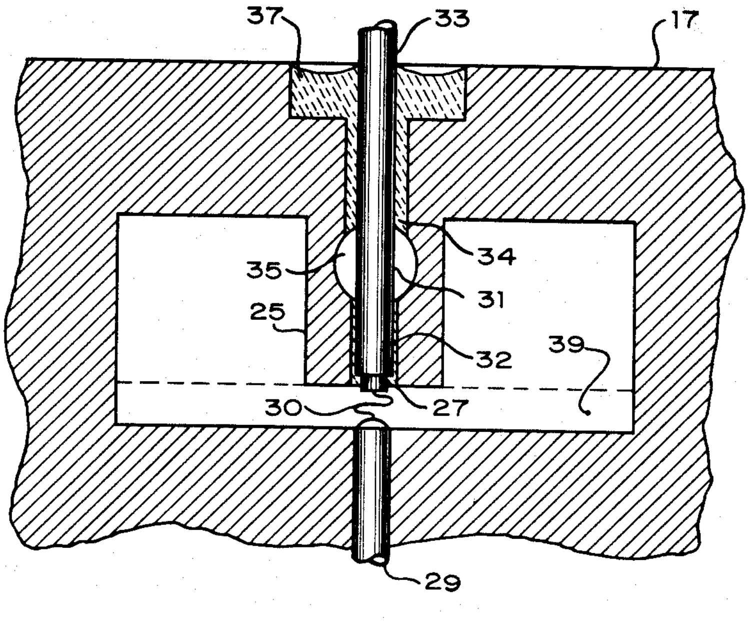
FIGURE 3 is a cross-sectional view of the crystal mount and filter portion of the apparatus of FIGURE 1.

Referring to FIGURE 3, there is shown a cross-sectional view of crystal mount and filter 17. The protruding section 25 of the crystal mount has substantially the same cross-sectional dimensions as the ridge of waveguide section 9. The crystal rectifier comprises a thin wafer of silicon 27 mounted on conductor 31, and an S-shaped wire 30 having a sharp point. The wire is mounted on conductor 29 and is mounted to form a point contact junction on the surface of the wafer 27. Conductors 29 and 31, which serve as mounting posts for the crystal rectifier components, are provided to simplify the mechanical assembly of the components and are secured in place by a suitable potting compound after mechanical adjustment is made. The protruding end 33 of conductor 31 is connected to external circuitry through connector 23 of FIGURE 1. Conductor 29 is connected to the crystal mount 17.

Conductor 31 is positioned to pass through the lower portion of protruding section 25 with close tolerance, diametrically through hole 35, and axially through recessed cavity 37. This arrangement constitutes a low-pass filter which serves to pass only the D.-C. component and reject the high frequency components of the rectified signal. The portion of conductor 31 which passes with close tolerance through protruding section 25 thus serves as a low impedance transmission line. The portion of conductor 31 which passes diametrically through drill hole 35 thus serves as a high impedance transmission line. Insulating material 32 is provided between conductor 31 and the lower portion of protruding section 25.

The desired shape for a cavity about conductor 31 to constitute a high impedance transmission line is a concentrically located cylindrical cavity which is one-quarter wavelength long at the design center frequency. However, drill hole 35, which has a diameter of one-quarter wavelength, provides a cavity that is considered adequate to provide a high impedance transmission line. And the portion of conductor 31 which passes axially through recessed cavity 37 similarly serves as a high impedance transmission line. The recessed cavity 37 is filled with a resin-base potting compound containing fine particles of ferrous material such as the type commonly known as "polyiron." The potting compound serves to secure conductor 31 in place after mechanical adjustments have been made, and also serves to absorb the small amount of high frequency power which passes through the filters along conductor 31. Thus, the alternate quarter wavelength sections of low impedance and high impedance transmission, as previously described, serve to reject the high frequency components of the signal provided by the crystal detector, and to permit only the D.-C. component of the rectified wave to pass to the external circuit.

The cross-sectional area of the waveguide in the crystal mount, noted generally as 39, is chosen to provide waveguide impedance that is substantially equal to the impedance of the crystal rectifier. This cross-sectional area corresponds dimensionally with the cross-sectional area of slot 20 in waveguide section 19. Waveguide section 19 provides the transition between the cross-section area of slot 20, and the standard cross-sectional area of waveguide apparatus which is used in conjunction with the apparatus of the present invention.

Therefore, the frequency doubler of the present invention provides the means to obtain a broad band of microwave frequencies with relatively high conversion efficiency without having to adjust or tune the device as the applied frequency is varied. The present invention, in conjunction with a relatively inexpensive signal generator, provides a simpler and less expensive means of obtaining signal frequencies in the K band or the R band than it is possible to obtain by using a series of klystron oscillators to cover the same band of frequencies. Moreover, the frequency doubler of the present invention provides an output signal in the form of an unidirectional current which is substantially linearly related to the second harmonic output power over the entire band of operating frequencies. This permits the use of a simple monitoring circuit to indicate the level of output frequency power.

I claim:

1. frequency doubler device for operation over a waveguide band of frequencies comprising a first section providing a transition from rectangular to ridged waveguide, filtering means attached to the rectangular waveguide end of said first section through which a fundamental waveguide frequency is applied to said first section, said filtering means being adapted to absorb reflected wave power at harmonics of the applied fundamental frequency, a second section having substantially the same waveguide cross-section as the ridged waveguide end of said first section and adapted to be attached thereto, means including a first conductor insulated from said second section passing through the ridge of said second section serving as a low pass transmission line filter, a thin semiconductor wafer having substantially plane-parallel surfaces, said first conductor being connected to one surface of said wafer and mounted normal thereto, said other surface of said wafer being mounted substantially flush and coplanar with the lower surface of said ridge, a second conductor passing through the guide wall opposite the ridge in said second section and connected thereto, contact means connected to said second conductor and traversing the distance between the lower surface of said ridge and the opposite guide wall, said contact means communicating with said other surface of said wafer in point contacting relation therewith to form a crystal rectifier, means to connect external circuitry between said first and second conductors, and a third section adapted to be attached to said second section and serving to provide the transition from the rectangular cross-section of the space between the lower surface of said ridge and the opposite guide wall to the standard rectangular cross-section of waveguide apparatus attached thereto.

2. A frequency doubler device for operation over a waveguide band of frequencies comprising a first section providing a transition from rectangular to ridged waveguide, filtering means attached to the rectangular waveguide end of said first section through which a fundamental waveguide frequency is applied to said first section, said filtering means being adapted to absorb reflected wave power at harmonics of the applied fundamental frequency, a second section having substantially the same waveguide cross-section as the ridged waveguide end of said first section and adapted to be attached thereto, a first conductor insulated from said second section passing through regions located substantially within the ridge of said second section which constitute alternate regions of high and low impedance transmission line, a thin semiconductor wafer having substantially plane-parallel surfaces, said first conductor being connected to one surface of said wafer and mounted normal thereto, said other surface of said wafer being mounted substantially flush and coplanar with the lower surface of said ridge, a second conductor passing through the guide wall opposite the ridge in said second section and connected thereto, contact means connected to said second conductor and traversing the distance between the lower surface of said ridge and the opposite guide wall, said contact means communicating with said other surface of said wafer in point contacting relation therewith to form a crystal rectifier, means to connect external circuitry between said first and second conductors, and a third section adapted to be attached to said second section and serving to provide the transition from the rectangular cross-section of the space between the lower surface of said ridge and the opposite guide wall to the standard rectangular cross-section of waveguide apparatus attached thereto.

3. A frequency doubler device for operation over a waveguide band of frequencies comprising a first section providing a transition from rectangular to ridged waveguide, filtering means attached to the rectangular waveguide end of said first section through which a fundamental waveguide frequency is applied to said first section, said filtering means being adapted to absorb reflected wavepower at harmonics of the applied fundamental frequency, a second section having substantially the same waveguide cross-section as the ridged waveguide end of said first section and adapted to be attached thereto, a cavity in said second section located adjacent to said first section on the guide wall opposite said ridge serving as a shorted waveguide for the second harmonic of the applied fundamental frequency, a first conductor insulated from said second section passing through regions located substantially within the ridge of said second section which constitute alternate regions of high and low impedance transmission line, a thin semiconductor wafer having substantially plane-parallel surfaces, said first conductor being connected to one surface of said wafer and mounted normal thereto, said other surface of said wafer being mounted substantially flush and coplanar with the lower surface of said ridge, a second conductor passing through the guide wall opposite the ridge in said second section and connected thereto, contact means connected to said second conductor and traversing the distance between the lower surface of said ridge and the opposite guide wall, said contact means communicating with said other surface of said wafer in point contacting relation therewith to form a crystal rectifier, means to connect external circuitry between said first and second conductors, and a third section adapted to be attached to said second section and serving to provide the transition from the rectangular cross-section of the space between the lower surface of said ridge and the opposite guide wall to the standard rectangular cross-section of waveguide apparatus attached thereto.

4. A frequency doubler device for operation over a waveguide band of frequencies comprising a first section providing a transition from rectangular to ridged waveguide, filtering means attached to the rectangular waveguide end of said first section through which a fundamental waveguide frequency is applied to said first section, said filtering means being adapted to absorb reflected wavepower at harmonics of the applied fundamental frequency, a second section having substantially the same waveguide cross-section as the ridged waveguide end of said first section and adapted to be attached thereto, a cavity in said second section located adjacent to said first section on the guide wall opposite said ridge serving as a shorted waveguide for the second harmonic of the applied fundamental frequency, a first conductor insulated from said second section passing through regions located substantially within the ridge of said second section which constitute alternate regions of high and low impedance transmission line, a thin semiconductor wafer having substantially plane-parallel surfaces, said first conductor being connected to one surface of said wafer and mounted normal thereto, said other surface of said wafer being mounted substantially flush and coplanar with the lower surface of said ridge, a second conductor passing through the guide wall opposite the ridge in said second section and connected thereto, contact means connected to said second conductor and traversing the distance between the lower surface of said ridge and the opposite guide wall, said contact means communicating with said other surface of said wafer in point contacting relation therewith to form a crystal rectifier the impedance of which is selected to be substantially equal to the impedance of the waveguide of said second section, means to connect external circuitry between said first and second conductors, and a third section adapted to be attached to said second section and serving to provide the transition from the rectangular cross-section of the space between the lower surface of said ridge and the opposite guide wall to the standard rectangular cross-section of waveguide apparatus attached thereto.

5. A frequency doubler device for operation over a waveguide band of frequencies comprising a first section providing a transition from rectangular to ridged waveguide, filtering means attached to the rectangular waveguide end of said first section through which a fundamental waveguide frequency is applied to said first section, said filtering means being adapted to absorb reflected wavepower at the second harmonic of the applied fundamental frequency, a second section having substantially the same waveguide cross-section as the ridged waveguide end of said first section and adapted to be attached thereto, a cavity in said second section located adjacent to said first section on the guide wall opposite said ridge serving as a shorted waveguide for the second harmonic of the applied fundamental frequency, a first conductor insulated from said second section passing through regions located substantially within the ridge of said second section which constitute alternate regions of high and low impedance transmission line, a thin semiconductor wafer having substantially plane-parallel surfaces, said first conductor being connected to one surface of said wafer and mounted normal thereto, said other surface of said wafer being mounted substantially flush and coplanar with the lower surface of said ridge, a second conductor passing through the guide wall opposite the ridge of said second section and connected thereto, contact means connected to said second conductor and traversing the distance between the lower surface of said ridge and the opposite guide wall, said contact means communicating with said other surface of said wafer in point contacting relation therewith to form a crystal rectifier the impedance of which is selected to be substantially equal to the impedance of the waveguide of the second section, means to connect external circuitry between said first and second conductors, and a third section adapted to be attached to said second section and serving to provide the transition from the rectangular cross-section of the space between the lower surface of said ridge and the opposite guide wall to the standard rectangular cross-section of waveguide apparatus attached thereto.

6. Apparatus according to claim 5 wherein said filtering means comprises a first section of rectangular waveguide having a plurality of higher frequency waveguides located along the broad walls of said rectangular waveguide in a direction that is transverse to the direction of power propagation through said section, and wherein each of said higher frequency waveguides contains a power absorbing load located at a predetermined distance from the junction of the higher frequency waveguide and the said rectangular waveguide.

7. A frequency doubler device for operation over a waveguide band of frequencies comprising a first portion providing a transition from rectangular to ridged waveguide, a first section of rectangular waveguide attached to the rectangular waveguide end of said first section through which a fundamental waveguide frequency is applied to said first portion, said first section of rectangular waveguide having plane-parallel surfaces at each end thereof, and having a plurality of higher frequency waveguides located in each of said surfaces along the broad walls of said rectangular waveguide, each of said higher frequency waveguides being oriented in a direction that is transverse to the direction of power propagation through said section and being adapted to absorb reflected wavepower at the second harmonic of the applied fundamental frequency, a second portion having substantially the same waveguide cross-section as the ridged waveguide end of said first portion and adapted to be attached thereto, a cavity in said second portion located adjacent to said first portion on the guide wall opposite said ridge serving as a shorted waveguide for the second harmonic of the applied fundamental frequency, a first conductor insulated from said second portion passing through regions located substantially within the ridge of said portion which constitute alternate regions of high and low impedance transmission line, a thin semiconductor wafer having substantially plane-parallel surfaces, said first conductor being connected to one surface of said wafer and mounted normal thereto, said other surface of said wafer being mounted substantially flush and co-planar with the lower surface of said ridge, a second conductor passing through the guide wall opposite the ridge of said second portion and connected thereto, contact means connected to said second conductor and traversing the distance between the lower surface of said ridge and the opposite guide wall, said contact means communicating with said other surface of said wafer in point contacting relation therewith to form a crystal rectifier the impedance of which is selected to be substantially equal to the impedance of the waveguide of the second portion, means to connect external circuitry between said first and second conductors, and a third portion adapted to be attached to said second portion and serving to provide the transition from the rectangular cross-section of the space between the lower surface of said ridge and the opposite guide wall to the standard rectangular cross-section of waveguide apparatus attached thereto.

8. A frequency doubler device for operation over a waveguide band of frequencies comprising a first portion providing a transition from rectangular to ridged waveguide, a first section of rectangular waveguide attached to the rectangular waveguide end of said first portion through which a fundamental waveguide frequency is applied to said first portion, said first section of rectangular waveguide having plane-parallel surfaces at each end thereof and having a plurality of higher frequency waveguides located in each of said surfaces along the broad walls of said rectangular waveguide, each of said higher frequency waveguides being oriented in a direction that is transverse to the direction of power propagation through said section and being adapted to absorb reflected wave power at the second harmonic of the applied fundamental frequency, a second section of rectangular waveguide attached to said first section of rectangular waveguide through which a fundamental waveguide frequency is applied to said first section of rectangular waveguide, a third section of rectangular waveguide attached to said second section through which a fundamental waveguide frequency is applied to said second section, said third section of rectangular waveguide having plane-parallel surfaces at each end thereof and having a plurality of higher frequency waveguides located in each of said surfaces along the broad walls of said rectangular waveguide, each of said higher frequency waveguides being oriented in a direction that is transverse to the direction of power propagation through said section and being adapted to absorb reflected wave power at the second harmonic of the applied fundamental frequency, a second portion having substantially the same waveguide cross-section as the ridged waveguide end of said first portion and adapted to be attached thereto, a first conductor insulated from said second portion passing through regions located substantially within the ridge of said portion which constitute alternate regions of high and low impedance transmission line, a thin semiconductor wafer having substantially plane-parallel surfaces, said first conductor being connected to one surface of said wafer and mounted normal thereto, said other surface of said wafer being mounted substantially flush and coplanar with the lower surface of said ridge, a second conductor passing through the guide wall opposite the ridge of said second portion and connected thereto, contact means connected to said second conductor and traversing the distance between the lower surface of said ridge and the opposite guide wall, said contact means communicating with said other surface of said wafer in point contacting relation therewith to form a crystal rectifier, the impedance of which is selected to be substantially equal to the impedance of the waveguide of the second portion, means to connect external circuitry between said first and second conductors, and a third portion adapted to be attached to said second portion and serving to provide the transition from the rectangular cross-section of the space between the lower surface of said ridge and the opposite guide wall to the standard rectangular cross-section of wave guide apparatus attached thereto.

9. A frequency doubler device for operation over a waveguide band of frequencies comprising a first portion providing a transition from rectangular to ridged waveguide, a first section of rectangular waveguide attached to the rectangular waveguide end of said first portion through which a fundamental waveguide frequency is applied to said first portion, said first section of rectangular waveguide having plane-parallel surfaces at each end thereof and having two higher frequency waveguides located along each of the broad walls exposed on said surfaces of said rectangular waveguide, each of said higher frequency waveguides having a width that is substantially equal to one-half the broadest width of said rectangular waveguide, and being oriented in a direction that is transverse to the direction of power propagation through said section and being adapted to absorb reflected wave power at the second harmonic of the applied fundamental frequency, a second section of rectangular waveguide attached to said first section of rectangular waveguide through which a fundamental waveguide frequency is applied to said first section of rectangular waveguide, a third section of rectangular waveguide attached to said second section through which a fundamental waveguide frequency is applied to said second section, said third section of rectangular waveguide having plane-parallel surfaces at each end thereof and having one higher frequency waveguide located substantially in the center of each of the broad walls of said rectangular waveguide exposed on said surfaces, each of said higher frequency waveguides being oriented in a direction that is transverse to the direction of power propagation through said section and being adapted to absorb reflected wave power at the second harmonic of the applied fundamental frequency, said second section being designed to prevent interaction between said first and second sections, a second portion having substantially the same waveguide cross-section as the ridged waveguide end of said first portion and adapted to be attached thereto, a cavity in said second portion located adjacent to said first portion on the guide wall opposite said ridge serving as a shorted waveguide for the second harmonic of the applied fundamental frequency, a first conductor insulated from said second portion passing through regions located substantially within the ridge of said portion which constitute alternate regions of high and low impedance transmission line, a thin semiconductor wafer having substantially plane-parallel surfaces, said first conductor being connected to one surface of said wafer and mounted normal thereto, said other surface of said wafer being mounted substantially flush and coplanar with the lower surface of said ridge, a second conductor passing through the guide wall opposite the ridge of said second portion and connected thereto, contact means connected to said second conductor and traversing the distance between the lower surface of said ridge and the opposite guide wall, said contact means communicating with said other surface of said wafer in point contacting relation therewith to form a crystal rectifier, the impedance of which is selected to be substantially equal to the impedance of the waveguide of the second portion, means to connect external circuitry between said first and second conductors, and a third portion adapted to be attached to said second portion, and serving to provide the transition from the rectangular cross-section of the space between the lower surface of said ridge and the opposite guide wall to the standard rectangular cross-section of waveguide apparatus attached thereto.

10. A frequency doubler device for operation over a waveguide band of frequencies comprising a first portion providing a transition from rectangular to ridged waveguide, a first section of rectangular waveguide attached to the rectangular waveguide end of said first portion through which a fundamental waveguide frequency is applied to said first portion, said first section of rectangular waveguide having plane-parallel surfaces at each end thereof and having two higher frequency waveguides located along each of the broad walls exposed on each of said surfaces of said rectangular waveguide, each of said higher frequency waveguides having a width that is substantially equal to one-half the broadest width of said rectangular waveguide and having therein an absorptive load located at a predetermined distance from the junction thereof with said rectangular waveguide, each of said higher frequency waveguides also being oriented in a direction that is transverse to the direction of power propagation through said section and being adapted to absorb reflected wave power at the second harmonic of the applied fundamental frequency, a second section of rectangular waveguide attached to said first section of rectangular waveguide through which a fundamental waveguide frequency is applied to said first section of rectangular waveguide, a third section of rectangular waveguide attached to said second section through which a fundamental waveguide frequency is applied to said second section, said third section of rectangular waveguide having plane-parallel surfaces at each end thereof and having one higher frequency waveguide located substantially in the center of each of the broad walls of said rectangular waveguide exposed on each of said surfaces, each of said higher frequency waveguides having a width that is substantially equal to one-half the broadest width of said rectangular waveguide and having therein an absorptive load located at a predetermined distance from the junction thereof with said rectangular waveguide, each of said higher frequency waveguides also being oriented in a direction that is transverse to the direction of power propagation through said section and being adapted to absorb reflected wave power at the second harmonic of the applied fundamental frequency, said second section being designed to prevent interaction between said first and third filter sections, a second portion having substantially the same waveguide cross-section as the ridged waveguide end of said first portion and adapted to be attached thereto, a cavity in said second portion located adjacent to said first portion on the guide wall opposite said ridge serving as a shorted waveguide for the second harmonic of the applied fundamental frequency, a first conductor insulated from said second portion passing through regions located substantially within the ridge of said portion which constitute alternate regions of high and low impedance transmission line, a thin semiconductor wafer having substantially plane-parallel surfaces, said first conductor being connected to one surface of said wafer and mounted normal thereto, said other surface of said wafer being mounted substantially flush and coplanar with the lower surface of said ridge, a second conductor passing through the guide wall opposite the ridge of said second portion and connected thereto, contact means connected to said second conductor and traversing the distance between the lower surface of said ridge and the opposite guide wall, said contact means communicating with said other surface of said wafer in point contacting relation therewith to form a crystal rectifier, the impedance of which is selected to be substantially equal to the impedance of the waveguide of the second portion, means to connect external circuitry between said first and second conductors, and a third portion adapted to be attached to said second portion, and serving to provide the transition from the rectangular cross-section of the space between the lower surface of said ridge and the opposite guide wall to the standard rectangular cross-section of waveguide apparatus attached thereto.

11. Apparatus according to claim 10 wherein each of said higher frequency waveguides is a rectangular waveguide having a waveguide low frequency cutoff that is substantially higher than the applied fundamental frequency.

12. A broadband frequency doubling device comprising a first envelope and a dielectric therein for conducting high frequency energy, a unidirectional conduction element disposed near one end of the envelope to receive said high frequency energy, a second envelope of nonresonant structure attached to said one end of the first envelope and being adapted to conduct higher frequency energy than the first envelope, filter means near the other end of the first envelope, means including the filter means to apply the high frequency energy to the first envelope, said filter means being adapted to absorb said higher frequency energy conducted in the first envelope and to pass the high frequency energy applied to the first envelope, and means disposed near said one end of the first envelope to increase the higher frequency energy conducted in the second envelope and to decrease the higher frequency energy conducted in the first envelope.

13. A broadband frequency doubling device comprising a first envelope and a dielectric therein for conducting microwave energy within a first band of frequencies, a unidirectional conduction element disposed near one end of the envelope to receive said microwave energy, a second envelope attached to said one end of the first envelope and being adapted to conduct microwave energy within a second band of frequencies, the second band being higher in frequency than the first band, filter means near the other end of the first envelope, means including the filter means to apply the microwave energy within the first band to the first envelope, said filter means being adapted to absorb microwave energy within the second band conducted in the first envelope and to pass the microwave energy within the first band applied to the first envelope, and means disposed near said one end of the first envelope to increase the microwave energy within the second band conducted in the second envelope and to decrease the microwave energy within the second band of frequencies conducted in the first envelope.

14. A broadband frequency doubling device comprising a first envelope and a dielectric therein for conducting microwave energy within a first band of frequencies, a unidirectional conduction element disposed near one end of the envelope to receive said microwave energy, a second envelope attached to said one end of the first envelope and being adapted to conduct microwave energy within a second band of frequencies, the second band being higher in frequency than the first band, filter means near the other end of the first envelope, means including the filter means to apply the microwave energy within the first band to the first envelope, said filter means being adapted to absorb microwave energy within the second band conducted in the first envelope and to pass the microwave energy within the first band applied to the first envelope, and reactance means disposed near said one end of the first envelope to increase the microwave energy within the second band conducted in the second envelope and to decrease the microwave energy within the second band of frequencies conducted in the first envelope.

15. A broadband frequency doubling device comprising a first envelope and a dielectric therein for conducting microwave energy within a first band of frequencies, a unidirectional conduction element disposed near one end of the envelope to receive said microwave energy within the first band of frequencies, a second envelope attached to said one end of the first envelope and being adapted to conduct microwave energy within a second band of frequencies, the second band of frequencies being at least a factor of two higher in frequency than the first band of frequencies, filter means near the other end of the first envelope, means including the filter means to apply the microwave energy within the first band to the first envelope, said filter means being adapted to absorb said microwave energy within the second band of frequencies in the first envelope and to pass the microwave energy within the first band of frequencies applied to the first envelope, and a transmission line of one quarter wavelength substantially at the center of the second band of frequencies disposed near said one end of the first envelope to increase the microwave energy within the second band of frequencies conducted in the second envelope and to decrease the microwave energy within the second band of frequencies conducted in the first envelope.

References Cited by the Examiner

UNITED STATES PATENTS

| | | | |
|---|---|---|---|
| 2,460,109 | 1/49 | Southworth | 321—43 |
| 3,060,365 | 10/62 | Crandell | 321—69 |

OTHER REFERENCES

Solid State Microwave Electronic II, by Fortini and Vilms, published by Digest of Technical Papers, February 13, 1959; pages 82 and 83 relied on.

LLOYD McCOLLUM, *Primary Examiner.*

SAMUEL BERNSTEIN, *Examiner.*